Patented Oct. 1, 1935

2,016,102

UNITED STATES PATENT OFFICE 2,016,102

PRODUCTION OF CONVERSION PRODUCTS OF RUBBER

Wilhelm Breuers, Ludwigshafen-on-the-Rhine, Germany, assignor to I. G. Farbenindustrie Aktiengesellschaft, Frankfort-on-the-Main, Germany No Drawing. Application August 16, 1932, Serial No. 629,081. In Germany August 24, 1931

7 Claims. (Cl. 260—1)

The present invention relates to the production of conversion products of rubber.

It has already been proposed to treat rubber with sulphuric acid, organic sulphonic acids, trichloracetic acid, or salts, such as iron chloride or antimony chloride, in order to obtain conversion products of rubber. Conversion products of rubber, which constitute readily soluble products have also already been prepared by heating rubber for about 60 hours in the presence of small amounts of inert, organic liquids such as ethyl ether or cyclohexane at from 250° to 260° C. This conversion proceeds very slowly, however, and is practically not complete until after heating for several days.

I have now found that very valuable conversion products of rubber are obtained in an advantageous manner by heating unvulcanized rubber at from about 150° to about 300° C., if desired in a closed vessel, when the said heating is carried out for several hours, for example about 20 hours, in the presence of finely divided porous surface-active substances having a slightly acid reaction, in particular slightly acid, active carbon or slightly acid bleaching earths.

The term "unvulcanized rubber" is meant to define all varieties of solid, commercial India rubber such as crêpe rubber, smoked sheets or coagulated crude rubber of any kind and origin. The aforesaid active carbon may be chosen from any kind of commercial active carbon having a slightly acid reaction. A suitable carbon of this kind may be prepared for example by heating carbohydrates or materials containing the same, such as wood, cellulose or starch or charcoal, or mixtures of such materials, together with anhydrous zinc chloride, for example according to the German Patent No. 290,656. Another method of obtaining a slightly acid, active carbon consists in heating the said carbonaceous materials together with oxygen-bearing acids of phosphorus, until carbonization occurs, for example according to the German Patent No. 371,691 or to the U. S. Patent No. 1,621,195. It is also possible to prepare an active carbon of the kind defined by heating carbonaceous materials of the said kind in the presence of volatile chlorides, such as aluminium or ammonium chloride, for example according to the German Patent No. 338,852. Whereas a few methods according to which slightly acid active carbon may be produced are hereinbefore indicated, it is to be understood that my invention is not limited to the employment of such specific slightly acid active carbon, since a large number of other known processes allow of obtaining such a carbon and a large number of such materials are available in commerce. The slightly acid active bleaching earths suitable for the process of my invention are generally obtained by working crude bleaching earths of natural origin, in particular bleaching earths containing hydrated aluminia silicates, such as terra alba or argillaceous earths, with acids, such as phosphoric, sulphuric, hydrochloric, oxalic or tartaric acids especially for purifying the said materials and increasing their adsorptive power. The said slightly acid active bleaching earths generally contain up to 0.05 per cent of acid which is retained in the said earths after washing even with a large amount of water. Suitable earths of the said kind are sold, for instance, under the trade names Clarit, Frankonit, Isarit, Terrana, Alsil or Tonsil. The porous surface-active substances are employed in a finely divided, preferably in powdered, form. By the co-employment of the said surface-active substances during the heating operation a considerable shortening of the duration of the reaction is obtained; furthermore the resulting conversion products are considerably paler in colour than the conversion products prepared in the absence of the said substances. The quantity of surface-active substances employed generally amounts to from about 5 to about 100, preferably from about 10 to about 40 per cent of the weight of the rubber employed.

If desired, the reaction may be carried out in the presence of 10 to 50, up to about 100 per cent, by weight of the rubber, of organic liquids, which dissolve rubber and/or the conversion products obtained therefrom but which do not chemically react with the rubber and the said conversion products, and are not decomposed on heating to about 300° C., and the boiling point of which is below about 150° C. at from 20 to 30 millimetres mercury gauge. Aromatic hydrocarbons may eventually react with the rubber and are therefore preferably avoided. Alcohols and ketones should not be employed because they do not dissolve the rubber nor the conversion products; similarly, halogenated hydrocarbons such as cholorform or chlorobenzene are not suitable because they are not inert under the working conditions.

As suitable organic liquids of the kind above defined may be mentioned for example aliphatic ethers such as di-ethyl ether, di-methyl ether, dipropyl ether, methyl-ethyl ether, methyl-propyl ether, ethyl-propyl ether or saturated aliphatic, i.e. open-chain aliphatic and cycloaliphatic, hydrocarbons such as saturated benzine fractions boiling below about 150° C. at from 20 to 30 millimeters mercury gauge, hexahydrotoluene, hexyhydroxylene, ethylcyclohexane, cyclohexane and decyhydronaphthalene. The reaction temperature depends on the degree of the desired conversion; it is generally between about 150° and 300° C., preferably between about 200° and about 270° C. The treatment is generally carried on for from about 5 to about 30 hours and, preferably, during about 5 to about 20 hours. When the conversion is completed, the conversion product may be isolated by filtration or by pouring its filtered solution into, preferably anhydrous, ethyl alcohol or acetone and repeatedly precipitating it from mixtures of ethyl ether and ethyl alcohol or of ethyl ether and acetone. The solvent may also be distilled off and liquids of low boiling point formed as by-products may be distilled off from the residue with steam in vacuo.

The conversion products thus obtained generally speaking constitute transparent resinous bodies having a lower degree of unsaturation than rubber. They have a brownish colour and become soft at about 50° C. and thinly liquid at from 120° to 150° C. The colour number of the new products is usually from about 9 to 14 (see Joh. Scheiber, "Lacke und ihre Rohstoffe", Leipzig, 1926, pages 488/89), whereas the conversion products of rubber obtainable according to the known processes are black and non-transparent. They are suitable for the preparation of coating preparations and adhesives, for example for combining rubber with metals, such as iron, for preparing insulating coatings on electric wires or cables, and as additions for oils of electric transformers, since the said products increase the viscosity of the oils. The conversion products still contain double linkages and are therefore still very reactive; thus for example by hydrogenating the conversion products, solid almost colourless resins are obtained which have a colour number of about 2 and may also be used for example for the preparation of lacquers, adhesives, and of insulating materials. Water-soluble sulphonic acids can be prepared from the unsaturated products by the action of chlorsulphonic acid in the presence of ethyl ether. The resins can be subjected to vulcanization either as such or in mixture with natural rubber.

The following examples will further illustrate how this invention may be carried out in practice, but the invention is not restricted to these examples. The parts are by weight.

Example 1

300 parts of crêpe rubber are heated in a rotary autoclave at from 250° to 260° C. for about 30 hours together with 50 parts of a pulverized carbon activated with phosphoric acid prepared according to the Patent No. 1,621,195, and 100 parts of ethyl ether. The carbon is then removed by filtration and the ether is distilled off. After distilling off small amounts of products of cracking with the aid of steam up to about 275° C. at a pressure of about 30 millimetres mercury gauge, the conversion product remains as a residue. The yield is almost quantitative. The refractive index of the light yellow product obtainable by catalytically hydrogenating the conversion product is 1.514 at 20° C. Instead of the pulverized carbon, 50 parts of the purified Bavarian bleaching earth obtainable under the trade mark of "Tonsil AC" may be employed, the heating being stopped after about 20 hours in this case.

Example 2

600 parts of crêpe rubber are heated in a rotary autoclave together with 200 parts of the purified Bavarian bleaching earth known under the trade mark of "Tonsil AC" for 5 hours to 200° C., further 5 hours to 225° C. and finally for 10 hours to from 250° to 260° C. The product is then mixed with about 2000 parts of benzene and the mixture is filtered, the solvent being then evaporated from the solution at first by distillation at normal pressure and then, for removing remainders of solvent and of products of cracking, by heating for about 2 hours to about 200° C. at about 30 millimetres of mercury. A brittle, transparent brown resin is obtained. Instead of filtration after adding benzene, the product may be directly filtered while hot, though in this case a certain quantity adsorbed by the bleaching earth is lost or must be removed therefrom by dissolution. Instead of crêpe rubber, an equal amount of smoked sheets may be subjected to the same treatment.

Example 3

8 parts of the bleaching earth known under the trade mark of "Tonsil AC" are rolled into 20 parts of crêpe rubber, whereupon the whole is heated in a muffle furnace for 5 hours to about 200° C. After cooling, the reaction mixture is mixed with about 60 parts of benzene, the solution is filtered and worked as described in the foregoing example, while carrying out the heating in vacuo at about 12 millimetres. A transparent reddish-brown resin is obtained.

In the appended claims the expression "a finely divided, porous, surface-active substance having a slightly acid reaction" is intended to cover substances such as active carbon and bleaching earths which, in the course of their preparation for use, have incorporated in them a small amount of acid, generally up to 0.05 per cent.

What I claim is:—

1. In the production of resin-like conversion products of unvulcanized rubber by heating, the steps which comprise carrying out the reaction for from about 5 to about 30 hours at a temperature ranging from about 150° to not exceeding about 300° C., in the presence of a finely divided, porous surface-active substance having a slightly acid reaction, and separating the formed resin-like conversion product from the said surface-active substance.

2. In the production of resin-like conversion products of unvulcanized rubber by heating, the step which comprises carrying out the reaction for from about 5 to about 30 hours at from about 200° to about 270° C. in the presence of a finely divided, porous, surface-active substance having a slightly acid reaction, selected from the class consisting of slightly acid active carbon and slightly acid bleaching earths, and separating the formed resin-like conversion product from the said surface-active substance.

3. In the production of resin-like conversion products of unvulcanized rubber by heating, the step which comprises carrying out the reaction for from about 5 to about 30 hours at from about 150° to not exceeding about 300° C. in the presence of a finely divided, porous, surface-active substance having a slightly acid reaction, selected from the class consisting of slightly acid active carbon and slightly acid bleaching earths, and of organic liquids, stable at the working temperatures, capable of dissolving at least one of rubber and the resulting conversion product and the boiling point of which liquids is below 150° C. at from 20 to 30 millimetres mercury gauge, and separating the formed resin-like conversion product from the said surface-active substance.

4. In the production of conversion products of unvulcanized rubber by heating, the step which comprises carrying out the reaction for from about 5 to about 30 hours at from about 150° to about 300° C. in the presence of a finely divided, porous, surface-active substance having a slightly acid reaction, selected from the class consisting of slightly acid active carbon and slightly acid bleaching earths, and of organic liquids, selected from the class consisting of aliphatic ethers and aliphatic hydrocarbons the boiling point of which liquids is below 150° C. at from 20 to 30 millimetres mercury gauge.

5. In the production of conversion products of unvulcanized rubber by heating, the step which comprises carrying out the reaction for from about 5 to about 20 hours at from about 200° to about 270° C. in the presence of from about 10 to about 40 per cent, by weight of the rubber, of a finely divided, porous, surface active substance having a slightly acid reaction, selected from the class consisting of slightly acid active carbon and slightly acid bleaching earths and of organic liquids, selected from the class consisting of aliphatic ethers and aliphatic hydrocarbons, the boiling point of which liquids is below 150° C. at from 20 to 30 millimetres mercury gauge, pouring the filtered solution into ethyl alcohol and repeatedly precipitating the conversion product from mixtures of ethyl ether and ethyl alcohol.

6. In the production of conversion products of unvulcanized rubber by heating, the step which comprises carrying out the reaction for from about 5 to about 20 hours at from about 200° to about 270° C. in the presence of from about 10 to about 40 per cent, by weight of the rubber, of a pulverized carbon activated with phosphoric acid and of ethyl ether, pouring the filtered solution into ethyl alcohol and repeatedly precipitating the conversion product from mixtures of ethyl ether and ethyl alcohol.

7. As new articles of manufacture, transparent, resinous conversion products of unvulcanized rubber, having a brownish colour, which become soft at about 50° C. and thinly liquid at from 120° to 150° C., have a colour number between 9 and 14 and yield, by hydrogenaton, solid, almost colourless resinous products, having a colour number of about 2, said conversion products having properties substantially identical with the property of products produced by the process of claim 1.

WILHELM BREUERS.